(12) United States Patent
Schwarz

(10) Patent No.: US 12,539,410 B2
(45) Date of Patent: Feb. 3, 2026

(54) CATHETER VALVE FOR CONTROLLING THE FLUID FLOW OF A MEDIUM

(71) Applicant: UROMED Kurt Drews KG, Oststeinbek (DE)

(72) Inventor: Werner Schwarz, Ruhpolding (DE)

(73) Assignee: UROMED Kurt Drews KG, Oststeinbek (DE)

( * ) Notice: Subject to any disclaimer, the term of this patent is extended or adjusted under 35 U.S.C. 154(b) by 343 days.

(21) Appl. No.: 18/281,481

(22) PCT Filed: Mar. 16, 2022

(86) PCT No.: PCT/DE2022/000026
§ 371 (c)(1),
(2) Date: Sep. 11, 2023

(87) PCT Pub. No.: WO2022/199734
PCT Pub. Date: Sep. 29, 2022

(65) Prior Publication Data
US 2024/0299726 A1    Sep. 12, 2024

(30) Foreign Application Priority Data
Mar. 25, 2021 (DE) ............... 10 2021 001 563.0

(51) Int. Cl.
*A61M 39/26* (2006.01)
*A61M 39/28* (2006.01)

(52) U.S. Cl.
CPC .......... *A61M 39/26* (2013.01); *A61M 39/286* (2013.01)

(58) Field of Classification Search
CPC .. A61M 39/26; A61M 39/286; A61M 39/287; A61M 2039/1077;
(Continued)

(56) References Cited

U.S. PATENT DOCUMENTS

| 2,197,995 A | 4/1940 | Crowley |
| 3,503,400 A | 3/1970 | Osthagen et al. |

(Continued)

FOREIGN PATENT DOCUMENTS

| DE | 2941278 A1 | 4/1980 |
| DE | 102007002765 B3 | 4/2008 |

(Continued)

OTHER PUBLICATIONS

International Search Report dated Jun. 23, 2022 filed in PCT/DE2022/000026.

*Primary Examiner* — Philip R Wiest
*Assistant Examiner* — Brandon W. Levy
(74) *Attorney, Agent, or Firm* — Rankin, Hill & Clark LLP

(57) ABSTRACT

A catheter valve for controlling the fluid flow of a medium, in particular a self-closing catheter valve, wherein a main body includes: —an inlet and an outlet-, —a flexible tube, —as a cover, a slider which is movable in the longitudinal direction, and —at the inlet of the catheter valve, a stepped barbed part for connecting a supply line; and, in the interior of the main body that comprises two laterally opposite vertical chambers, the catheter valve has two contradirectional downward inclines on the longitudinally movable slider for actuating and guiding two vertically movable magnets, which are arranged on two opposite sides of the valve house and selectively close or open the passage of said valve hose, wherein an adapter can be inserted and fastened at the outlet of the catheter valve and (in addition to the longitudinally movable slider) results in a permanent open position of the catheter valve.

15 Claims, 4 Drawing Sheets

Figure 1:
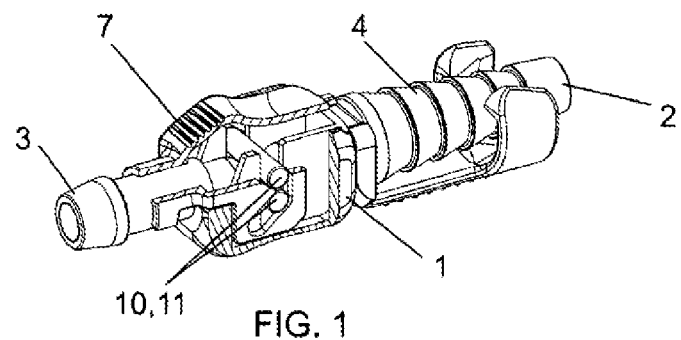

(58) Field of Classification Search
CPC .............. A61M 25/0075; A61M 39/28; A61M 2205/0272; A61M 16/0875; A61M 2205/0216; F16K 7/045; F16K 31/0675; F16K 31/0655; F16K 31/06; F16K 27/029; F16K 31/082; F16K 31/08; F16K 31/084; F16K 31/086; F16K 31/088; F16K 35/16; A61F 5/4405; A61F 2/0018
See application file for complete search history.

(56) References Cited

U.S. PATENT DOCUMENTS

| | | | |
|---|---|---|---|
| 3,731,670 A | | 5/1973 | Loe |
| 3,939,821 A | | 2/1976 | Roth |
| 4,024,855 A | * | 5/1977 | Bucalo ................. A61F 2/0036 600/12 |
| 4,243,034 A | | 1/1981 | Brandt |
| 4,570,898 A | | 2/1986 | Staeubli |
| 5,522,806 A | | 6/1996 | Schonbacler et al. |
| 10,518,010 B2 | | 12/2019 | Liebing |
| 2013/0324975 A1 | * | 12/2013 | Douglas .............. A61M 39/283 604/328 |
| 2018/0245699 A1 | | 8/2018 | Lee |

FOREIGN PATENT DOCUMENTS

| | | | | |
|---|---|---|---|---|
| DE | 102013012158 A1 * | 1/2015 | ............. | F16K 7/066 |
| DE | 102019100509 B4 | 10/2020 | | |
| EP | 0088871 A1 | 9/1983 | | |
| EP | 3047873 A1 * | 7/2016 | ......... | F16K 31/0679 |
| EP | 3247450 B1 | 8/2019 | | |
| EP | 3679978 A1 | 7/2020 | | |
| WO | 9324173 A1 | 12/1993 | | |

* cited by examiner

CATHETER VALVE FOR CONTROLLING THE FLUID FLOW OF A MEDIUM

The invention relates to a catheter valve for controlling the fluid flow of a medium, in particular a self-closing catheter valve, wherein a main body comprises an inlet and an outlet, a flexible tube and, as a cover, a slider which is movable in the longitudinal direction and a stepped barbed part at the inlet of the catheter valve for connecting a supply line.

Urinary incontinence is a common condition that can occur for a variety of reasons, such as illness, injury, or debilitation. A urinary incontinence condition is usually characterized by the weakness or total lack of function of the muscles that control the expansion and contraction of the urethral sphincter. To date, no surgical procedures are known that satisfactorily correct an incontinence condition such that bladder control is substantially restored.

Attempts to ameliorate the incontinence condition have included the use of passive devices, such as a collection bag worn by the user, to collect urine discharged from the ureter. A disadvantage of this solution is that the bladder continuously empties into the bag without the user having any control over the urine output. Another disadvantage of this solution can be seen in the fact that the collection bag has to accompany the user and thus impedes his activities.

The catheter valves used in urology are increasingly used for chronic patients. Especially in geriatrics, patients have to use catheter valves for years. To date, little attention has been paid to this fact.

In order to meet these conditions, both design aspects must be taken into account, as well as constructive aspects, which are partly dictated by the design.

Attempts to solve such problems, such as lack of control, large volume, discomfort and inhibition of activities have led to the development of valved incontinence control devices that eliminate external collection systems and allow the user can manually control the emptying of urine from the urethra. Examples of such devices are described in U.S. Pat. Nos. 3,503,400, 3,939,821 and 4,024,855.

Also known is U.S. Pat. No. 3,731,670, in which a bi-stable magnetic valve element requires a first magnetic actuation from the closed position back to an open position.

While such a device allows the user some emptying control, it is not sufficiently reliable. For example, if the valve undergoes a first actuation to an open position and emptying stops, the user may forget to perform a second actuation and return the valve to a closed position while it is still in the open position. If the valve is inadvertently left in the open position, unexpected emptying can occur.

The risk of unintentional opening also remains with a catheter valve as described in WO 93/24173. In the normal state, a spring element closes the flow through a flexible line portion. With the help of an actuating element in the form of a button, which is to be actuated against the force of the spring element, the closure can be released and the valve can be opened. With this arrangement, too, the actuating member can be relatively easily subjected to pressure exerted by bumping or accidental contact, so that this valve is also disadvantageous in that unintentional opening cannot be ruled out.

Furthermore, catheter valves are known which do not compress but instead bend the flexible line portion to close the same. EP 0 088 871 A1 works according to this principle. In this case, a portion of the flexible line is attached to a sleeve, so that a displacement of the sleeve relative to a housing, in which another portion of the flexible line is attached, leads to a shortening of the flexible line and a resulting buckling of the line, in that part of the line deviates to the side. The sleeve is held by a spring in a position in which the line is kinked as described and the passage through the line is thus closed.

However, the multiple kinking of the line, which is designed as a hose, leads to new problems. The constant kinking deformation of the hose leads to damage to the hose wall and makes it necessary to check the valve frequently and, under certain circumstances, even to replace the valve frequently. In addition, it is also not guaranteed in the described embodiment that an unintentional displacement of the sleeve and thus an opening of the flow is sufficiently prevented. Furthermore, such a catheter valve is in need of improvement in that its construction is unnecessarily complicated.

From U.S. Pat. No. 2,197,995 a so-called pinch valve is known in which, in an embodiment shown, two independently operable blocking elements act on a flexible line portion to control the flow. Each of the blocking elements can be moved individually. In this embodiment, the blocking elements are arranged opposite one another and the action of the blocking elements on the flexible line portion takes place at opposite points of the flexible line portion.

Furthermore, a catheter valve for controlling a fluid flow is known from EP 3 247 450 B1, which comprises a movable closure element that can assume different positions. The closure element can be driven by a magnetically acting valve drive.

The disadvantages of all the above solutions are:
complicated structural design
expensive manufacture
complicated usage
difficult cleaning and sterilization
many components required
magnetic body/force indirectly controls closure elements
no (single) hand operation possible
no permanent position/opening possible DE 10 2019 100 509 B4 discloses a catheter valve for adjusting a flow rate of a medium that can be exchanged with a catheter, which comprises a valve housing structure that partially delimits a catheter valve interior of the catheter valve and a bottom wall that is designed to support the catheter valve, a top wall arranged opposite the bottom wall and at least one side wall connecting the bottom wall and the top wall. The catheter valve also includes a line element for conducting the medium, which element extends in the longitudinal direction of the valve housing structure through the catheter valve interior, a closure device for blocking and releasing a flow of medium through the line element, an actuating element which is movably mounted relative to the valve housing structure and by means of which the closure device can be adjusted between a blocking position and a release position. The actuating element is slidably arranged on or in the top wall. Another aspect of the invention relates to a closure device for the catheter valve.

This solution has the following disadvantages:
possible material fatigue of the spring arm elements and of the spring element designed as an O-ring after repeated actuation can lead to the catheter valve leaking,
great force required to hold the opening,
no complete opening volume of the valve hose, due to the structural design, leads to a low flow rate and thus to a long emptying time, complex operability, a permanent position/opening of the valve must be activated by a cumbersome actuation of the slider, danger of forgetting to deactivate the permanent position on the valve when removing the urine bag, which may result in unintentional outflow of urine, large construction volume due to long spring arm elements impairs wearing comfort for the patient, consists of many individual components, the small distance between the actuating element and the valve outlet increases the risk of urine flowing over the patient's hand or fingers (hygiene), accidental disconnection or loosening of the catheter is possible.

Finally, DE 29 41 278 A1 discloses a cannula or catheter unit which has a piece of tubing and a movable pressure body, wherein a slider mounted on the outside of the wall surrounding the channel is movable back and forth in the longitudinal direction of the channel and has an inclined surface facing the pressure body, which transfers the pressure body between the two positions upon displacement of the slider.

This solution has the following disadvantages:

no self-closing function provided, as the slider must be operated to close the valve.

to open the valve, the slightly flexible hose must push the pressure bodies apart. This means that the hose material must have a certain rigidity. With long-term use, this can lead to material fatigue and thus increases the risk of a malfunction. In addition, a stiffer material can lead to a loss of tightness.

it is sealed radially around a cannula and the flexible hose is not completely compressed. The pressure bodies are designed spherically and would therefore not achieve a secure seal on the hose if they were pressed together without a cannula.

DE 10 2013 012 158 A1 describes a pinch valve which has a tubular valve element which is surrounded by an annular actuating member and which is flanked on opposite sides by pinch elements.

The pinch elements can be moved relative to the valve element by an actuating movement of the actuating member and selectively either open or block a valve channel of the valve element.

Disadvantages of this solution are:

the pinch elements move along a certain angle in the axial longitudinal direction towards the flexible hose. If the valve on the hose is used frequently, this can lead to material abrasion and jeopardize reliable tightness.

in addition, an axial longitudinal force acts on the loose hose, which can lead to a shifting in the position of the hose. This can lead to malfunctions or a leak in the valve.

to open and hold the position, a pushing must occur against a spring force, that is, the user must exert a relatively high force when emptying the bladder.

the spring is another component and leads to more material and assembly costs.

Finally, another pinch valve is known from DE 10 2007 002 765 B3, which is known in the embodiment as a combination of the two aforementioned DE 29 41 278 A1 and DE 10 2013 012 158 A1. The disadvantages of this solution are essentially the same as those mentioned above.

The object of the invention is to develop a catheter valve which:

1. is ergonomically effectively shaped, so that the patient can become accustomed to it even if they are bedridden for a long period of time;
2. since care costs are particularly significant for long-term patients, the catheter valve must be extremely economical;
3. since geriatric patients often have reduced motor function, the catheter valve must be operated extremely simply and using one hand;
4. since usage is often long-term, it must be possible to flush through and sterilize the entire valve without difficult disassembly,
5. unintended detachment of the catheter from the catheter valve is prevented, which avoids the risk of infection.

The object is achieved by a catheter valve having the features of claim 1 and by a catheter valve having the features of claim 2. Advantageous configurations are specified in the dependent claims.

This object is achieved, according to the invention in that the main body (1) having two contradirectional downward inclines comprises two contradirectional inclined chambers (12a; 13a) for actuating and guiding two vertically movable magnets (10; 11), which are arranged on two opposite sides of the valve hose (6) and selectively close or open the passage thereof, wherein an adapter (17) is to be inserted and fastened at the outlet (3) of the catheter valve, which—in addition to the longitudinally movable slider (7)—results in a permanent open position of the catheter valve. By sliding on the adapter (17) a longitudinal displacement of the slider (7) towards its open position is caused.

In a further embodiment of the solution according to the invention, the catheter valve comprises, inside the main body (1) comprising two laterally opposite vertical chambers (12b; 13b), on the longitudinally movable slider (7) a downward incline (8) and an inclined chamber (12a) for actuating and guiding a vertically movable magnet (10), which is arranged on a side of the valve hose (6) and selectively closes or opens the passage thereof, wherein an adapter (17) is to be inserted and fastened at the outlet of the catheter valve, which—in addition to the longitudinally movable slider (7)—results in a permanent open position of the catheter valve. Also in this case, by sliding on the adapter (17), a longitudinal displacement of the slider (7) towards its open position is caused.

An integrated or bilaterally pluggable safety device is arranged on the stepped barbed part of the inlet of the catheter valve.

The safety device is designed as a U-shaped double-sided clamp.

The adapter preferably has a locking ring, which engages over or engages in a barbed part of the outlet of the catheter valve, or is designed in such a way that it rests flexibly and firmly slipped over the outlet of the catheter valve.

According to the invention, the catheter valve can also be constructed in such a way that, instead of the longitudinally movable slider, a push button arranged on one side or both sides is installed to actuate the two magnets.

Removing the adapter from the catheter valve receptacle automatically closes the magnets and thus the tube. This closing is preferably brought about exclusively by the magnetic force that provides the restoring force. Optionally, but less preferred, this closing could be assisted by an additional spring force.

The catheter valve serves as an interface between the patient's inner catheter or catheter funnel and the urine bag. It can be opened manually for urination to establish urine flow. It can be set to a permanent position at night for a continuous flow of urine. It is suitable for long-term use (>30 days) and for bladder training.

Particular advantages of the invention:
- automatic opening and permanent positioning of the flow passage by inserting the adapter,
- the valve closes automatically when the adapter is removed, so no additional actuation is required,
- ergonomically advantageous shape and thus very easy operation even by bedridden patients,
- inexpensive production due to the small number of individual parts and simple assembly,
- easy cleaning and sterilization possible,
- small forces are required to hold the slider in the open position,
- full opening volume for fast urine emptying,
- small installation size for better wearing comfort,
- secure double-sided clamp protects against unintentional disconnection of catheter and catheter valve,
- short opening path of the slider for easy operability.

A special feature is the special design of the catheter valve due to the inventive interaction of the very innovatively designed, longitudinally movable slider with its two integrated downward inclines and the two integrated inclined chambers as well as the two vertical chambers of the main body for vertically moving the two magnets that close or open the valve hose.

As already described, an embodiment according to the invention with a magnet is also possible. In this case, the main body has a metallic plate with magnetic properties on its bottom, at the level of the magnet, acting as a counterpart.

The two vertical chambers delimit a vertical guide in which the two magnets or one magnet is movably guided. A longitudinal displacement of the slider results in the magnet or magnets being guided along the downward inclines and moved away from each other while being guided in the vertical guide. When the adapter is removed, the magnetic attraction causes the catheter valve to tend to return to its original position. If this magnetic force is sufficiently large, the catheter valve automatically returns to the closed state as soon as the adapter (17) is removed again.

EXEMPLARY EMBODIMENT

The invention will be explained in greater detail below in reference to an exemplary embodiment.

In the figures

Figure 2:
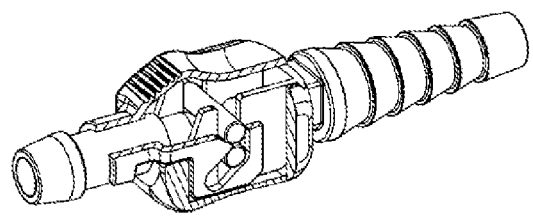
Figure 3:
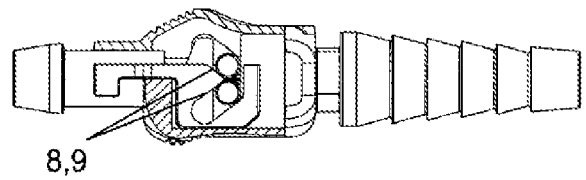
Figure 4:
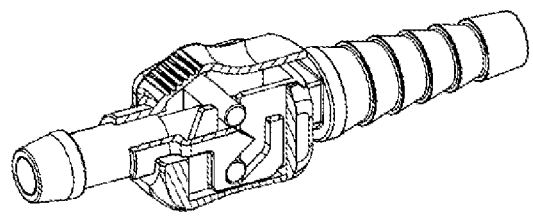
Figure 5:
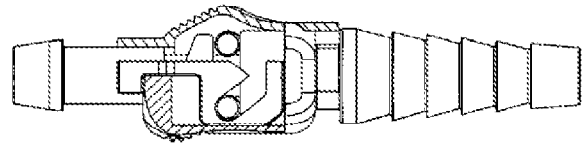
Figure 6:
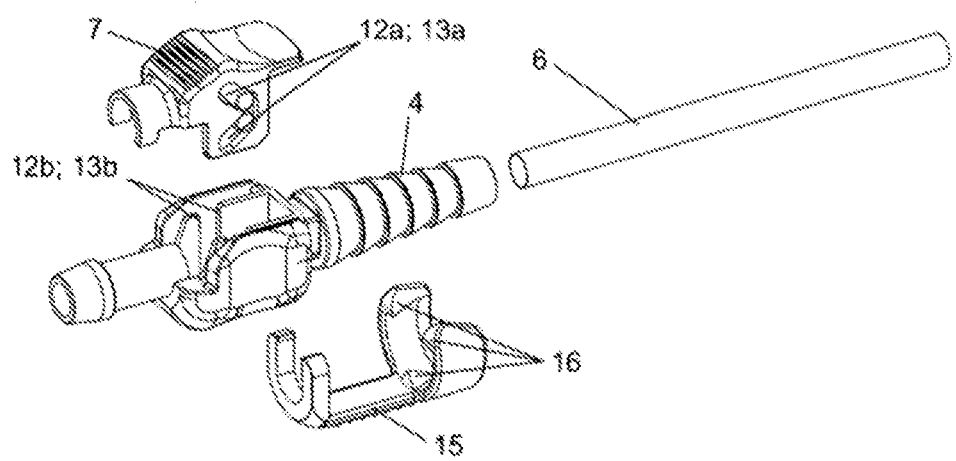
Figure 7:
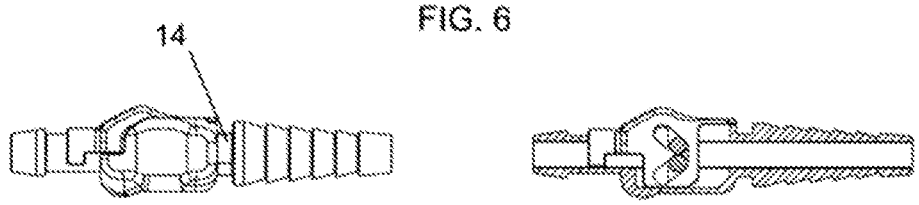
Figure 8:
Figures 9, 10:
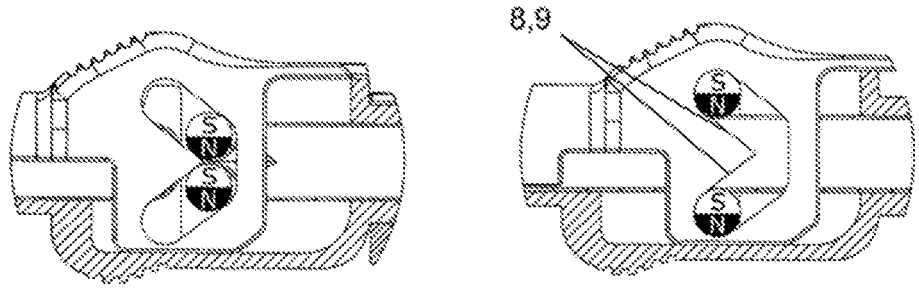
Figure 11:
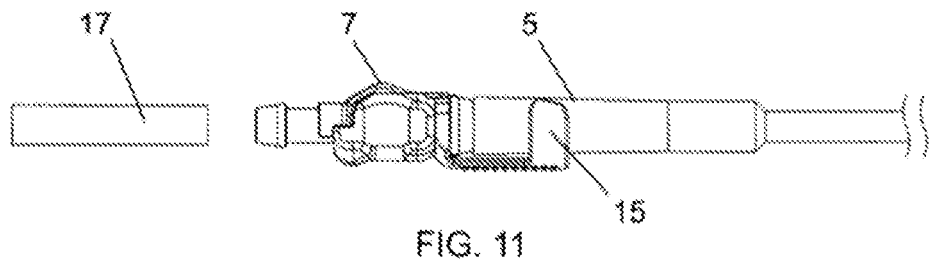
Figure 12:
Figure 13:
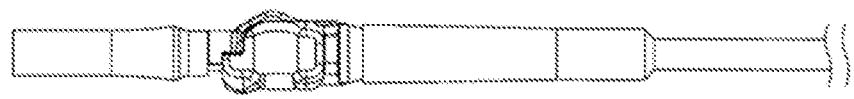
Figure 14:
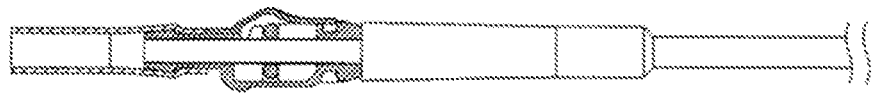
Figure 15:
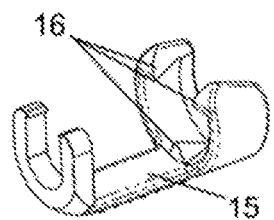
Figure 16:
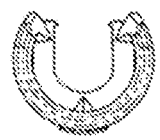
Figure 17:
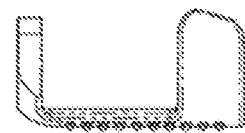
Figure 18:
Figure 19:
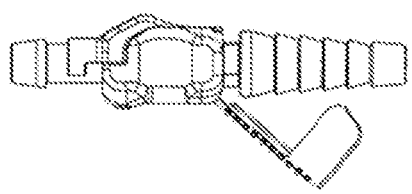

FIG. 1 shows the catheter valve in isometric view with closed magnets and double-sided clamp FIG. 2 shows the catheter valve in an isometric view and the main body in a sectional view with the magnets closed FIG. 3 shows the catheter valve in cross section with closed magnets FIG. 4 shows the catheter valve in isometric view and opened magnets FIG. 5 shows the catheter valve in cross section with opened magnets FIG. 6 shows the catheter valve in an isometric view and with lifted slider, double-sided clamp and valve hose FIG. 7 shows the catheter valve in the closed state FIG. 8 shows the catheter valve in the open state FIG. 9 shows the magnets closed FIG. 10 shows the magnets open FIG. 11 shows the catheter valve with double-sided clamp, adapter and catheter in side view FIG. 12 shows the catheter valve in a section with double-sided clamp, adapter and catheter in side view FIG. 13 shows the catheter valve with catheter and inserted adapter in side view FIG. 14 shows the catheter valve with inserted adapter in a section and catheter FIG. 15 shows a double-sided clamp in isometric view FIG. 16 shows a double-sided clamp in front view with pointed shaped geometry FIG. 17 shows a double-sided clamp in side view FIG. 18 shows a catheter valve with pluggable catheter protection FIG. 19 shows a catheter valve with integrated catheter protection The catheter valve has a main body 1 with an inlet 2 and an outlet 3 (FIGS. 1, 2, 3, 4, 5, 6, 7, 8, 9, 10). At the inlet 2 there is a stepped barbed part 4 for receiving the catheter 5 from the patient. The valve hose 6 is guided through the main body 1. On the main body 1, a longitudinally movable slider 7 is arranged, on which in the interior of the main body 1 two contradirectionally arranged downward inclines 8; 9 are located. By a longitudinal movement of the slider 7, the two magnets 10; 11 are moved over the downward inclines 8; 9 up or down in the vertical direction, thereby closing or opening the cross-section of the valve hose 6. The two magnets 10; 11 move up or down in two inclined chambers 12a; 13a against two vertically extending chambers 12b; 13b.

On the stepped barbed part 4, a groove 14 is arranged on the main body 1, into which one side of the double-sided clamp 15 engages (FIG. 7). The other side of the double-sided clamp 15 accesses the stepped barbed part 4 and the catheter 5, which is pushed onto the stepped barbed part 4.

The double-sided clamp 15 has, on the side aligned with the catheter 5, a special pointed geometry 16 with preferably three points, which means that the three points engage in the silicone material of the catheter 5 under tensile stress and thus prevent unintentional disconnection (FIG. 11, 12, 15, 16, 17, 18).

(FIG. 19) shows an integrated embodiment in which the double-sided clamp with the main body 1 consists of one component.

The adapter 17 is attached to the outlet 3 of the main body 1, to which the urine bag connection is connected (FIGS. 13, 14). When inserting the adapter 17, the slider 7 is moved in a longitudinal direction to abutment, thereby pushing it into the open position.

When the adapter 17 is removed, the catheter valve should preferably close automatically. This can be achieved by the magnetic force exerted on one another by the magnets 10, 11, which force is preferably sufficiently strong such that the magnets 10, 11 move towards one another along the downward inclines 8,9 and move towards each other while guided in the vertical guide formed by the vertical chambers 12b, 13b, while pushing the longitudinally movable slider 7 back into its initial position and pinching and thus closing the valve hose 6 located between the two magnets 10,11.

LIST OF REFERENCE NUMERALS

1—main body
2—inlet
3—outlet
4—stepped barbed part
5—catheter
6—valve hose
7—longitudinally movable slider
8—incline
9—incline 10—magnet
11—magnet
12a—inclined chamber
13a—inclined chamber
12b—vertical chamber
13b—vertical chamber
14—groove
15—double-sided clamp
16—pointed shape geometry
17—adapter

The invention claimed is:

1. A catheter valve assembly comprising:
an elongate main body having an inlet, an outlet and an interior;
a flexible valve hose extending through the interior of the main body in fluid communication with the inlet and the outlet, said valve hose defining a passage; and
a slider coupled to the main body, said slider being selectively movable longitudinally relative to the main body between a closed position and an open position;
wherein the main body includes a stepped barbed part at the inlet for establishing a connection to a catheter,
wherein two movable magnets are arranged in the interior of the main body on opposite sides of the valve hose,
wherein the interior of the main body includes guide channels within which portions of the two movable magnets are received,
wherein the longitudinally movable slider includes two contradirectional inclines,
wherein the two contradirectional inclines of the slider and the guide channels of the main body are configured to act upon and guide the two movable magnets such that
in the closed position of the slider the two movable magnets are drawn toward each other, the valve hose is compressed between the two movable magnets, and the passage through the valve hose is closed, and
in the open position of the slider the two movable magnets are separated from each other, the valve hose is not compressed between the two movable magnets, and the passage through the valve hose is open, and
wherein the outlet is configured to be inserted into and fastened to an adapter that holds the longitudinally movable slider in the open position.

2. The catheter valve assembly according to claim 1, further comprising an integrated or bilaterally pluggable safety device configured to be arranged on the stepped barbed part of the inlet and on a connected catheter.

3. The catheter valve assembly according to claim 2, wherein the safety device is a U-shaped double-sided clamp.

4. The catheter valve assembly according to claim 1, wherein the outlet comprises a barbed part over which the adapter is configured to flexibly slip.

5. The catheter valve assembly according to claim 1, wherein the outlet comprises a barbed part for engaging a locking ring of the adapter.

6. The catheter valve assembly according to claim 5, wherein the slider is configured to be held in the open position by the adapter when the locking ring of the adapter is engaged with the barbed part at the outlet.

7. The catheter valve assembly according to claim 1, wherein the catheter valve assembly is configured such that removal of the adapter from the outlet causes the longitudinally movable slider to move to the closed position.

8. A catheter valve assembly comprising:
an elongate main body having an inlet, an outlet, and an interior;
a flexible valve hose extending through the interior of the main body in fluid communication with the inlet and the outlet, said valve hose defining a passage; and
a slider coupled to the main body, said slider being selectively movable longitudinally relative to the main body between a closed position and an open position;
wherein the main body includes a stepped barbed part at the inlet for establishing a connection to a catheter,
wherein a movable magnet is arranged in the interior of the main body on one side of the valve hose,
wherein the interior of the main body includes guide channels within which portions of the movable magnet is received,
wherein the longitudinally movable slider includes an incline,
wherein the incline of the slider and the guide channels of the main body are configured to act upon and guide the movable magnet such that
in the closed position of the slider the movable magnet compresses the valve hose and closes the passage through the valve hose, and
in the open position of the slider the movable magnet does not compress the valve hose and the passage through the valve hose is open, and
wherein the outlet is configured to be inserted into and fastened to an adapter that holds the longitudinally movable slider in the open position.

9. The catheter valve assembly according to claim 8, wherein the main body further comprises a metallic plate with magnetic properties arranged opposite the one side of the valve hose where the movable magnet is arranged.

10. The catheter valve assembly according to claim 8, further comprising an integrated or bilaterally pluggable safety device configured to be arranged on the stepped barbed part of the inlet and on a connected catheter.

11. The catheter valve assembly according to claim 10, wherein the safety device is a U-shaped double-sided clamp.

12. The catheter valve assembly according to claim 8, wherein the outlet comprises a barbed part over which the adapter is configured to flexibly slip.

13. The catheter valve assembly according to claim 8, wherein the outlet comprises a barbed part for engaging a locking ring of the adapter.

14. The catheter valve assembly according to claim 13, wherein the slider is configured to be held in the open position by the adapter when the locking ring of the adapter is engaged with the barbed part at the outlet.

15. The catheter valve assembly according to claim 8, wherein the catheter valve assembly is configured such that removal of the adapter from the outlet causes the longitudinally movable slider to move to the closed position.

* * * * *